United States Patent
Clark et al.

[15] 3,701,543
[45] Oct. 31, 1972

[54] DRIVE MECHANISM FOR WHEELED VEHICLE

[72] Inventors: Wallace Clark, 1830 South German Church Road, Indianapolis, Ind. 46239; Reginald A. Jones, 35 Grand Canyon Drive, Los Alamos, N. Mex. 87544; James L. Teeters, 2115 Bryen Avenue, Lot C-9, Panama City, Fla. 32401

[22] Filed: Sept. 21, 1970

[21] Appl. No.: 73,991

[52] U.S. Cl. ................................ 280/234, 280/246
[51] Int. Cl. ........................................... B62m 1/12
[58] Field of Search ...... 280/240, 234, 233, 231, 246, 280/248, 230

[56] References Cited

UNITED STATES PATENTS

| 1,032,455 | 7/1912 | Waskom | 280/246 |
| 498,394 | 5/1893 | Huennekens | 280/248 X |
| 628,426 | 7/1899 | Woodruff | 280/234 X |
| 667,171 | 1/1901 | Christensen | 280/255 X |

FOREIGN PATENTS OR APPLICATIONS

| 543,761 | 1/1956 | Belgium | 280/248 |
| 1,075,855 | 5/1954 | France | 280/246 |
| 173,599 | 1/1935 | Switzerland | 280/240 |
| 414,067 | 11/1945 | Italy | 280/234 |

*Primary Examiner*—Kenneth H. Betts
*Attorney*—Mellville, Strasser, Foster & Hoffman

[57] ABSTRACT

Drive mechanism for occupant propelled wheeled vehicle including an occupant actuated pivotal lever drivingly connected by a crank mechanism to a pair of overrunning clutches carried on the driving sprocket shaft. The clutches are arranged to drive the shaft in the same direction but through angularly spaced limited driving arcs.

2 Claims, 2 Drawing Figures

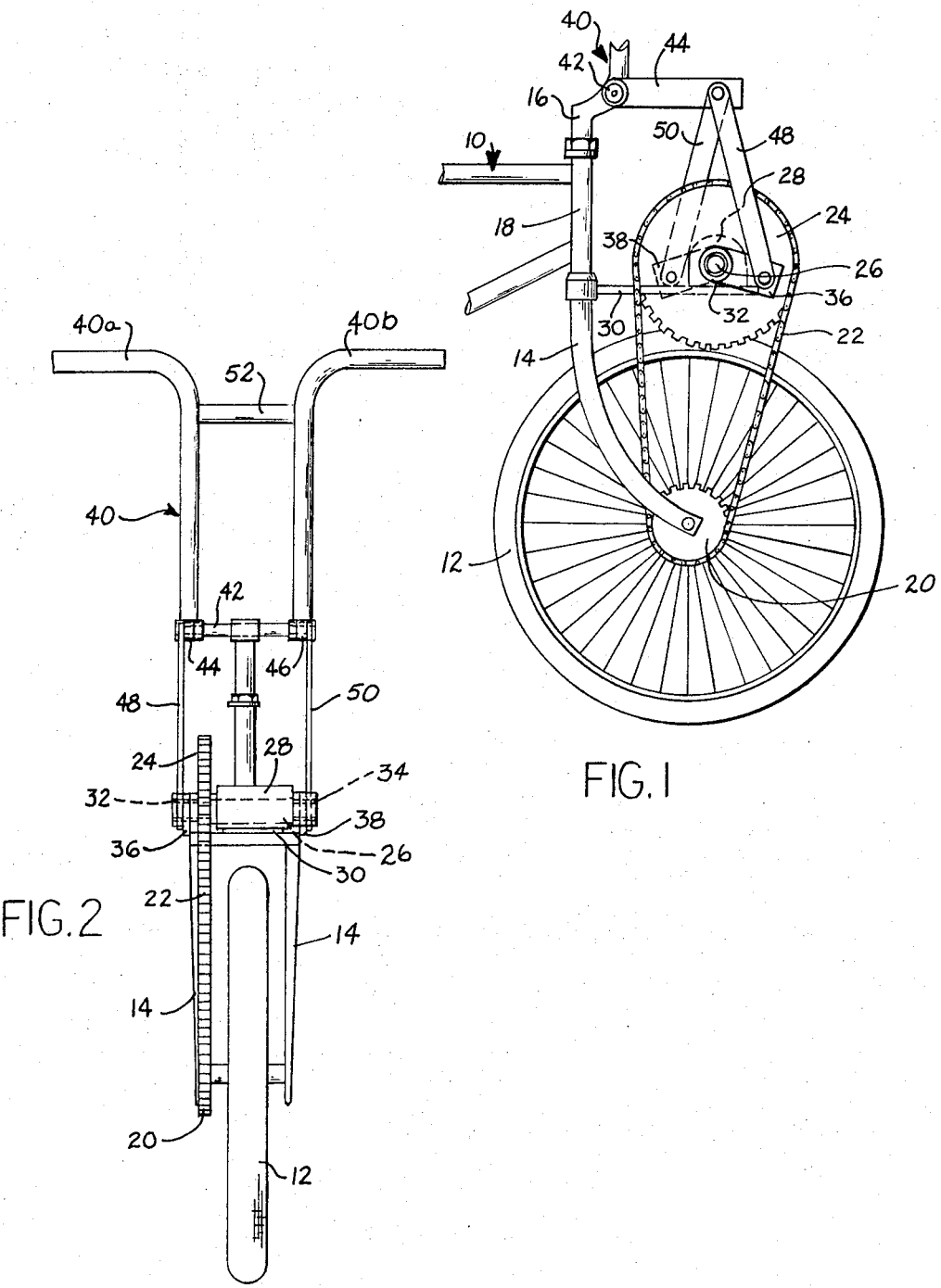

DRIVE MECHANISM FOR WHEELED VEHICLE

BACKGROUND OF THE INVENTION

This invention relates to a new and improved driving mechanism for an occupant propelled wheeled vehicle. The invention finds great and particular utility in the form of an auxiliary or arm operated drive on a conventional, pedaled bicycle.

The conventional bicycle is of course known throughout the world. It is used by many people as a necessary mode of transportation, and by many other people as a form of exercise and recreation. In either case, it has long been recognized that an auxiliary drive unit would serve many advantages. That is, an auxiliary drive, and particularly one actuated by the arms and back of the occupant would provide convenient exercise for nearly all parts of the human body. As a mode of transportation, the auxiliary drive would make the travelling of long distances easier and perhaps quicker.

The prior art has developed various forms of such auxiliary drives. Typically, the drive to the rear wheels of the bicycle is of the conventional pedal driven chain and sprocket type. In some cases, a hand actuated, rotatable crank drives a comparable chain and sprocket arrangement operatively connected to the front wheel of the vehicle. While such an arrangement provides many advantages, it renders the vehicle unusually difficult to steer.

Other auxiliary drives to the front wheel of a bicycle present unusual problems of interference between the main and auxiliary drive chains, and typically have proven wholly unsatisfactory for commercial development.

Accordingly, it is an object of this invention to provide a drive mechanism for an occupant propelled wheeled vehicle which is actuated by the hands and arms of the occupant.

It is a further object of this invention to provide such a drive mechanism which may be conveniently adapted for use as an auxiliary drive on a conventional, pedaled bicycle. Specifically, the auxiliary drive unit is so designed that it will not interfere with easy steering and handling of the bicycle, and the operation of the auxiliary drive will not in any way interfere with or limit the conventional drive.

It is a further object of this invention to provide an auxiliary drive actuated by a pivotal lever, wherein the length of the power stroke may be varied entirely at the option of the rider without necessitating any change or adjustment of the mechanism.

Still another object of the invention is to provide an auxiliary drive wherein coasting is possible at any time or position of the driving mechanism.

SUMMARY OF THE INVENTION

In its broadest terms, this invention contemplates a pivotal lever arranged to be actuated by the operator of the vehicle. This lever may take the form of a bell crank which is drivingly connected by means of a crank mechanism to at least one overrunning clutch which is carried on the driving sprocket shaft. Pivotal motion of the lever will drive the overrunning clutch through a limited arcuate travel, and the clutch is effective through this limited arcuate travel to drive the driving sprocket shaft. At all other times and positions, the clutch will overrun. The driving sprocket itself is of course operatively connected to a wheel of the vehicle.

DESCRIPTION OF THE DRAWING

FIG. 1 is a side elevational view of a portion of a bicycle showing the drive mechanism of this invention.

FIG. 2 is a front elevational view of a portion of the mechanism shown in FIG. 1.

DESCRIPTION OF THE PREFERRED EMBODIMENT

Referring first to FIG. 1, the front end of the frame of a conventional bicycle is indicated at 10. The front wheel 12 of the bicycle is rotatably journaled in the bifurcated steering fork 14 which includes the upwardly extending steering post 16 rotatably journaled in the sleeve 18 carried by the front end of the frame 10.

The driven sprocket 20 for the auxiliary drive of this invention is operatively secured to the front wheel 12, and connected by means of the chain 22 to the driving sprocket 24.

In the embodiment shown, the driving sprocket 24 will be keyed or otherwise securely fastened to the shaft 26 which is mounted to be rotatable on an axis parallel to the axis of rotation of the front wheel 12. The shaft 26 may be conveniently mounted in the bearing 28 which is secured to the bracket 30 secured to and extending forwardly from the top of the steering fork 14. Thus, the bracket 30 and shaft 26 will move with the steering post 16 so that the parallel relationship between the shaft 26 and the axis of rotation of the wheel 12 will be maintained at all times.

The shaft 26 also carries the pair of overrunning clutches 32 and 34. The overrunning clutches, per se do not form a part of this invention and hence will not be described in detail herein. They are readily available commercially. For present purposes, it is sufficient to state that these clutches are of a type which will be effective to drive the shaft 26 in one direction, and to permit free rotation of the shaft 26 relative to the clutch in the same direction. In the embodiment of this invention illustrated, the clutches 32 and 34 are arranged to drive the shaft 26 in the same direction but through angularly spaced driving arcs as explained hereinafter.

The clutches 32 and 34 respectively are provided with the crank arms 36 and 38 through which driving motion may be imparted to the clutches.

Power for the drive mechanism of this invention is applied through a pivotal motion of the handlebars of the vehicle. In the embodiment shown, the handlebars indicated generally at 40 are mounted for pivotal motion about the shaft 42. It will be seen that the shaft 42 is aligned parallel to the shaft 26, and will remain so aligned during movement of the steering post 16. The handlebars 40 in effect form a bell crank having the forwardly extending arms 44 and 46. These arms are connected to the cranks 36 and 38 respectively by means of the connecting rods 48 and 50.

It is believed that operation of the drive mechanism should be clear. The handlebars 40 and arms 44 may be pivoted about the shaft 42 by the occupant in either a clockwise or a counterclockwise direction. This of course will cause the connecting rods 48 and 50 to move up and down simultaneously.

As explained earlier, the overrunning clutches 32 and 34 are each arranged to drive the shaft 26 in the same direction but through angularly spaced driving arcs. In other words, as the connecting rod 48 moves downwardly, it will pivot the crank arm 36 downwardly and will be effective via the overrunning clutch 32 to drive the shaft 26. The driving arc during the downward stroke of the connecting rod 48 and crank arm 36 will be less than 180°.

While the connecting rod 48 is moving downwardly, it will of course be apparent that the connecting rod 50 is also moving downwardly, pivoting the crank arm 38 in a counterclockwise direction. By virtue of the overrunning clutch 34, this counterclockwise motion of the arm 38 will have no effect on the rotation of the shaft 26.

When the operator pulls back on the handlebars 40, pivoting the arms 44 and 46 in a counterclockwise direction, it will pull the connecting rods 48 and 50 upwardly, causing the crank arm 38 to rotate in a clockwise direction and the crank arm 36 to rotate in a counterclockwise direction. The crank arm 38 during its clockwise motion will be effective via the overrunning clutch 34 to drive the shaft 26, while by virtue of the overrunning clutch 32, the counterclockwise rotation of the arm 36 will have no effect at all on the rotation of shaft 26.

It will be apparent from the foregoing description that at least one of the overrunning clutches 32 and 34 will be overrunning at all times that the vehicle is in motion. It should also be apparent that the foregoing construction achieves the objectives noted earlier in this application. Specifically, it should be noted that even though a crank mechanism is used, there is no dead center position for either crank. Furthermore, the handlebars may be held by the operator in any stationary position, in which the front wheel drive is coasting. Thus, the operator may refrain from actuating the front wheel drive during such time as the vehicle is being steered. In addition, the travel distance for the driving stroke may be varied entirely at the will of the occupant, without performing any mechanical adjustment to the drive mechanism whatever.

It will be seen in FIG. 2 that the handlebars 40 include the locking bar 52 by means of which the handles 40a and 40b are locked together for a motion as a unit. It is within the scope of this invention to provide a releasable locking bar 52, so that if desired, the handlebars 40a and 40b could be moved separately at the option of the occupant.

Numerous modifications may be made in this invention without departing from its scope and spirit. For example, in the embodiment heretofore described, the components are arranged so as to provide a driving force on motion of the handlebars 40 in both directions. By repositioning one of the crank arms 36 and 38, the arrangement may be setup so that driving force is applied only on a forward stroke or a backward stroke of the handlebars 40.

Similarly, while the invention has been described in terms of its utilization as an auxiliary drive on a bicycle, the unit may be readily adapted for use on all sorts of other occupant propelled vehicles. For example, it can provide the sole source of power in a tricycle, could be used as an auxiliary drive mechanism in a tandem or multi-person bicycle, or could be used as the primary drive mechanism in any of the small children's wheeled vehicles.

Accordingly, no limitations are intended except insofar as set forth in the following claims.

The embodiments of the invention in which an exclusive property or privilege is claimed are defined as follows:

1. An auxiliary drive mechanism for a bicycle comprising:
   a. a rotatable driving shaft operatively associated with at least one wheel of said bicycle;
   b. a pair of over-running clutches carried by said shaft, said clutches being effective to drive said shaft in one direction and to permit free rotation of said shaft relative thereto in the same direction;
   c. power means for driving one of said clutches through an arcuate travel of less than 180°; and
   d. power means for driving the other of said clutches in the same direction through an arcuate travel of less than 180°, the driving arc of said other clutch being annularly spaced from the driving arc of said first mentioned clutch, whereby at least one of said clutches will be over-running at all times the bicycle is in motion, said power means for driving said clutches including
      i. a pair of bell cranks journaled for limited pivotal motion about an axis parallel to said shaft;
      ii. a crank arm operatively associated with each said clutch; and
      iii. a connecting rod extending from each said bell crank to one of said crank arms.

2. The improved drive mechanism claimed in claim 1 wherein the driving arcs of said overrunning clutches are oppositely disposed, whereby pivotal motion of said bell cranks in one direction will be effective to drive one of said clutches and pivotal motion of said bell cranks in the opposite direction will be effective to drive the other of said clutches.

* * * * *